(12) United States Patent
Menke

(10) Patent No.: US 7,552,700 B2
(45) Date of Patent: Jun. 30, 2009

(54) METHOD OF TAGGING A SHELLFISH AND A DETECTABLE SHELLFISH PRODUCED BY SUCH A METHOD

(75) Inventor: Gerry Menke, Victoria (AU)

(73) Assignee: MOLLUSC Pty Ltd, Victoria (AU)

( * ) Notice: Subject to any disclaimer, the term of this patent is extended or adjusted under 35 U.S.C. 154(b) by 591 days.

(21) Appl. No.: 10/486,852

(22) PCT Filed: Aug. 14, 2002

(86) PCT No.: PCT/AU02/01095

§ 371 (c)(1),
(2), (4) Date: Jul. 26, 2004

(87) PCT Pub. No.: WO03/015508

PCT Pub. Date: Feb. 27, 2003

(65) Prior Publication Data

US 2005/0005877 A1    Jan. 13, 2005

(30) Foreign Application Priority Data

Aug. 14, 2001    (AU) .................................... PR7019

(51) Int. Cl.
*A01K 61/00*    (2006.01)

(52) U.S. Cl. ..................................... 119/858; 119/234

(58) Field of Classification Search ................. 119/858, 119/234; 40/299.01, 300
See application file for complete search history.

(56) References Cited

U.S. PATENT DOCUMENTS

| 1,892,580 A | * | 12/1932 | Lester .......................... 40/300 |
| 4,133,294 A | * | 1/1979 | Bolton et al. ................ 119/234 |
| 5,579,724 A | | 12/1996 | Chauvin |

FOREIGN PATENT DOCUMENTS

| JP | 03053829 | * | 3/1991 |
| JP | 03053830 | * | 3/1991 |
| JP | 06141725 | * | 5/1994 |
| JP | 2864120 | * | 7/1999 |
| JP | 2004141084 | * | 5/2004 |
| JP | 2005-353028 A | * | 12/2005 |

OTHER PUBLICATIONS

JP 2005-353028 A (english translation).*
Derwent Abstract Accession No. 99-156514/14, (JP 2864120).

* cited by examiner

*Primary Examiner*—T. Nguyen
(74) *Attorney, Agent, or Firm*—Sughrue Mion, PLLC

(57) ABSTRACT

A method of tagging shellfish for the purpose of subsequent identification including providing a detectable tag, and fixedly engaging the detectable tag with a portion of the shellfish such that the detectable tag becomes incorporated into the shell portion as the shellfish grows.

15 Claims, 3 Drawing Sheets

METHOD OF TAGGING A SHELLFISH AND A DETECTABLE SHELLFISH PRODUCED BY SUCH A METHOD

CROSS-REFERENCE TO RELATED APPLICATIONS

The present application claims priority to and the benefit of the Australian Patent Application PR 7019, filed in the Australian Patent Office on Aug. 14, 2001, and the PCT Application PCT/AU02/01095, filed on Aug. 14, 2002, the entire contents of both of which are incorporated by this reference.

FIELD OF THE INVENTION

The present invention relates to a method of tagging shellfish for the purpose of subsequent identification and to a detectable shellfish produced by such a method. The invention is particularly applicable to shellfish such as abalone although it will be understood that the invention is also applicable to other types of shellfish.

BACKGROUND OF THE INVENTION

The harvesting of some types of shellfish such as abalone is often subject to government regulations the effect of which is to only allow removal from the ocean floor of shellfish which are identifiable beyond reasonable doubt as shellfish which have been pre-deposited by the harvester.

In view of such regulations, various methods have been used to correctly identify the shellfish, one such method including the step of applying a dye to a shell portion of the shellfish so that the shellfish exhibits a colour which is readily identifiable.

However, because a shellfish often remains in situ for long periods of time the colour of the shellfish often fades and identification becomes difficult.

An alternative method includes the step of fixing a tag to an outwardly facing surface of a shell portion of a shellfish, for example using glue.

However, with this method, the tag often detaches from the shellfish thereby precluding identification of the shellfish by a harvester.

SUMMARY OF THE INVENTION

In accordance with a first aspect of the present invention, there is provided a method of tagging a shellfish for the purpose of subsequent identification, said method including the steps of:
 providing a detectable tag arranged to fixedly engage in use with an edge of a shell portion of a shellfish; and
 fixedly engaging the detectable tag with an edge portion of a shellfish such that as the shellfish grows the tag becomes incorporated into the shell portion thereby preventing disengagement of the detectable tag from the shell portion.

In one embodiment, the detectable tag is a coil and the step of fixedly engaging the detectable tag with an edge portion of a shellfish includes the step of inserting the edge portion of the shellfish between adjacent turns of the coil.

In an alternative embodiment, the detectable tag is a clamp arranged to engage with at least two substantially opposite portions of the edge portion of the shellfish. The clamp may include a first clamp member extending in a first direction relative to the shellfish and a second clamp member extending in a direction generally perpendicular to the first direction, and the clamp members may be provided at remote ends with fingers arranged to engage with the edge portion.

Preferably, the detectable tag is formed of metal, which may be magnetised and which is preferably steel.

In one embodiment, the shellfish is abalone.

In accordance with a second aspect of the present invention, there is provided a detectable shellfish including:
 a shellfish; and
 a detectable tag fixedly engaged with an edge of a shell portion of shellfish;
 the arrangement being such that as the shellfish grows the detectable tag becomes incorporated into the shell portion thereby preventing disengagement of the detectable tag from the shell portion.

In one embodiment, the detectable tag is a coil arranged to receive an edge of a shell portion between adjacent turns of the coil.

In an alternative embodiment, the detectable tag is a clamp arranged to engage with at least two substantially opposite portions of the edge portion of the shellfish. The clamp may include a first clamp member extending in a first direction relative to the shellfish and a second clamp member extending in a direction substantially perpendicular to the first direction, and the first and second clamp members may be provided at remote ends with fingers arranged to engage with the edge portion.

In accordance with a third aspect of the present invention, there is provided a detectable shellfish including:
 a shellfish; and
 a detectable tag incorporated into a shell portion of the shellfish;
 the detectable tag being incorporated into the shell portion by engaging the detectable tag with an edge of the shell portion and subsequently allowing the shell portion to grow.

BRIEF DESCRIPTION OF THE DRAWINGS

An embodiment of the present invention will now be described, by way of example only, with reference to the accompanying drawings, in which.

The detectable shellfish 10 shown in the Figures is represented without it's inhabiting animal for the purpose of clarity. It will be understood, however, that in practice the inhabiting animal will also be present in the detectable shellfish 10.

Figure 1:
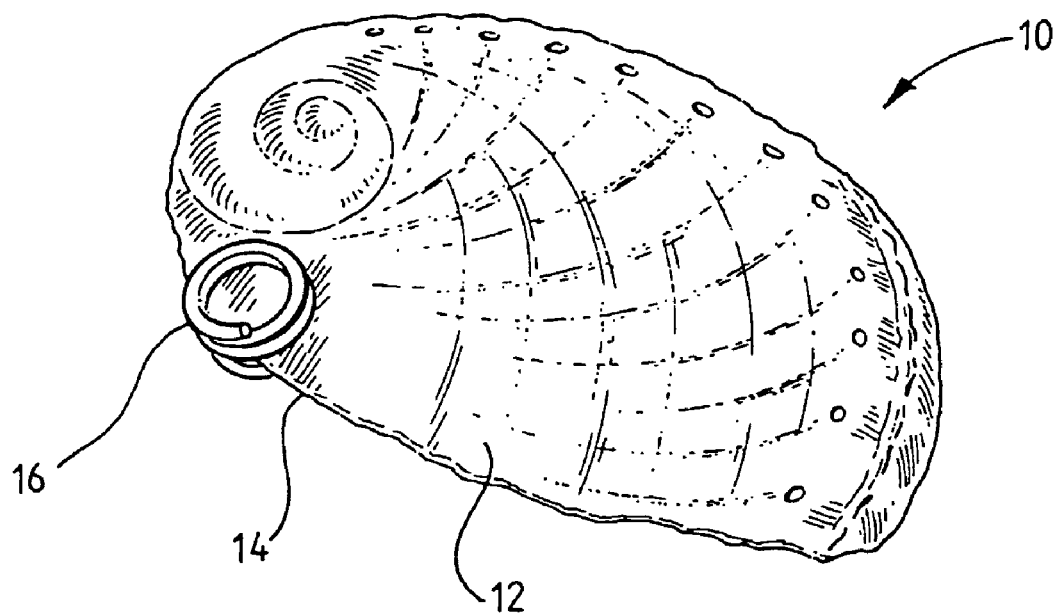
FIG. 1 is a diagrammatic representation of an upper side of a shell portion of a detectable shellfish in accordance with an embodiment of the present invention.
Figure 2:
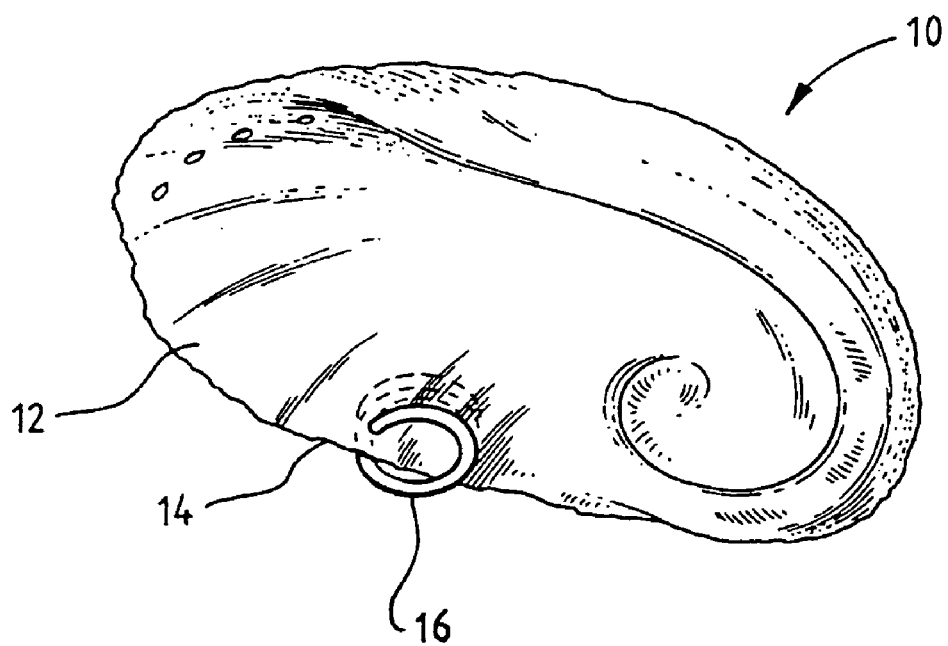
FIG. 2 is a diagrammatic representation of a lower side of the shell portion shown in FIG. 1.

Referring to FIGS. 1 and 2 of the drawings, there is shown a juvenile shellfish which has been tagged so as to provide a detectable shellfish 10.

In this example the shellfish is abalone, although it will be understood that other types of shellfish are also applicable to the present invention.

The detectable shellfish 10 includes a shell portion 12, an edge portion 14 which extends around the periphery of the shell portion 12, and a tag 16 engaged with the edge portion 14.

In the example shown in FIGS. 1 to 4, the tag 16 is a magnetised metal coil formed of non-corrosive material such as steel.

The tag 16 is engaged with the edge portion 14 of a juvenile shellfish by inserting the edge portion 14 between adjacent turns of the coil.

It will be understood that shell fish may be tagged at any stage i.e. their life cycle. That is, both juvenile and adult shell fish may be tagged using a method in accordance with an embodiment of the prevent invention.

Figure 3:
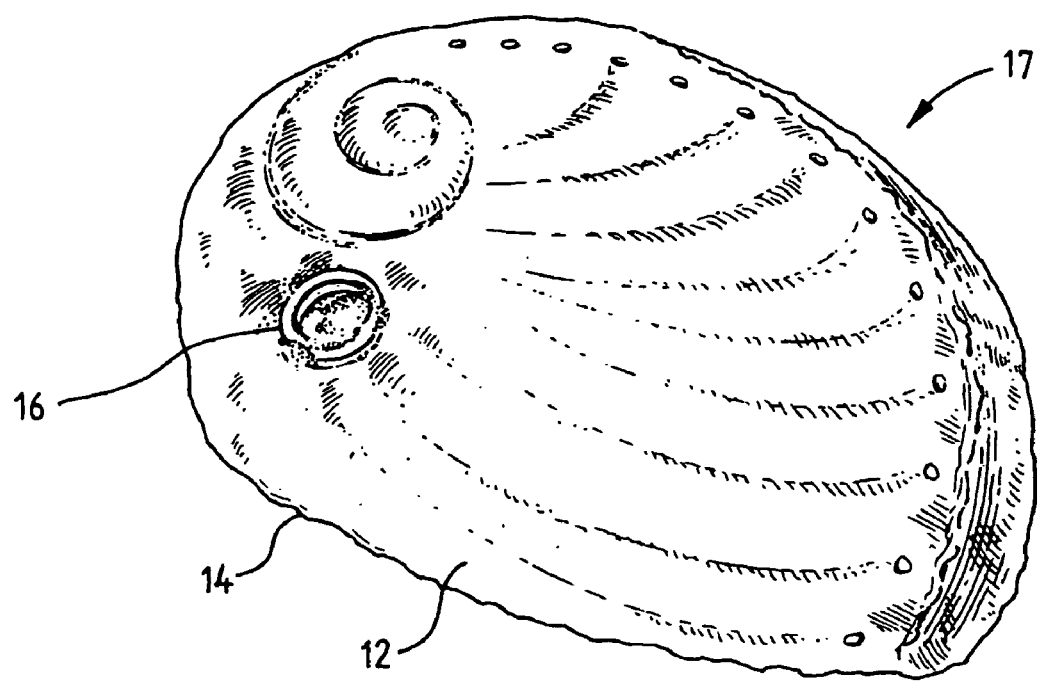
FIG. 3 is a diagrammatic representation of an upper side of the shell portion shown in FIGS. 1 and 2 when the shell portion has grown relative to the shell portion shown in FIGS. 1 and 2.
Figure 4:
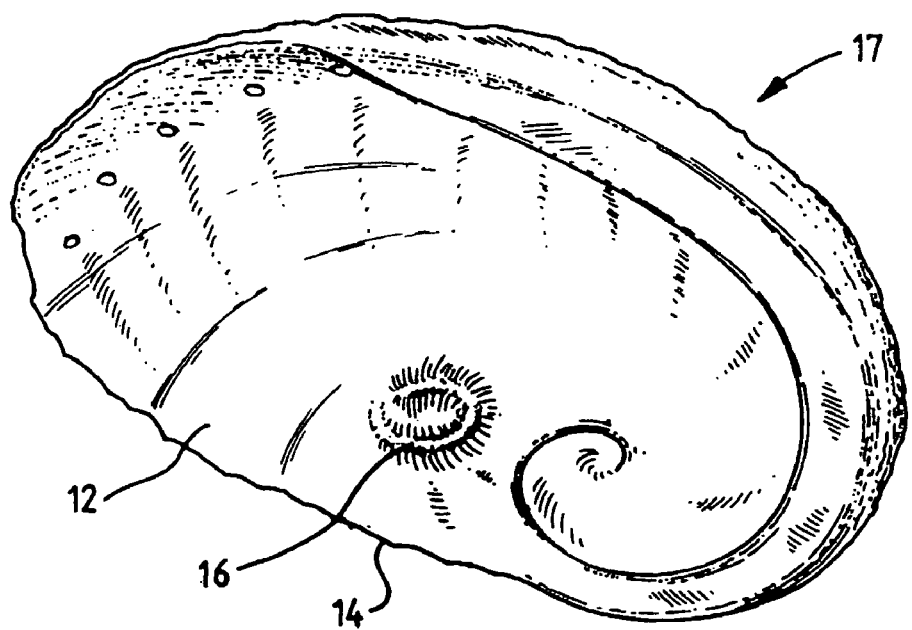
FIG. 4 is a diagrammatic representation of a lower side of the shell portion shown in FIGS. 1 and 2 when the shell portion has grown relative to the shell portion shown in FIGS. 1 and 2.

In FIGS. 3 and 4, there is shown a detectable shellfish 17 which has grown into an adult shellfish. Like features are indicated with like reference numerals. As can be seen in FIGS. 3 and 4, as the shellfish grows, the nacre of the shellfish grows around the tag 16, and the shell portion 12 eventually covers and surrounds the tag 16. In other words, the tag 16 becomes incorporated into the shell portion 12 as the shellfish grows. This serves to prevent disengagement of the tag from the shell portion.

Figure 5:
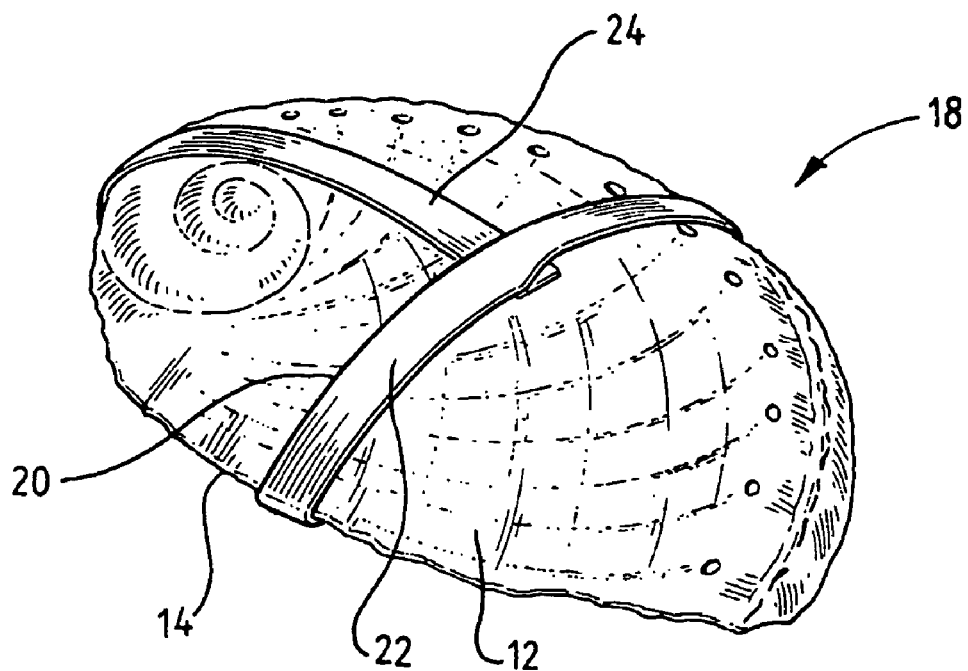
FIG. 5 is a diagrammatic representation of an upper side of a shell portion of a detectable shellfish in accordance with an alternative embodiment of the present invention.
Figure 6:
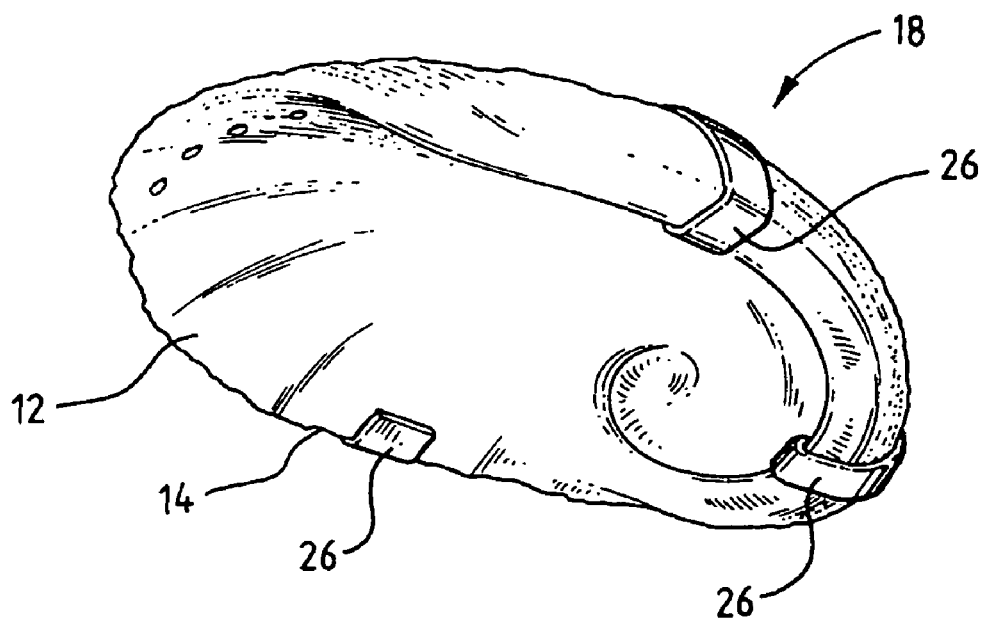
FIG. 6 is a diagrammatic representation of a lower side of the shell portion shown in FIG. 5.

In FIGS. 5 and 6, an alternative detectable shellfish is shown, FIGS. 5 and 6 illustrating a juvenile shellfish to which has been applied an alternative tag 20 so as to provide an alternative detectable shellfish 18. In this example, the alternative tag 20 is formed of magnetic non-corrosive material such as steel. Like features are indicated with like reference numerals.

The alternative tag 20 includes a first clamp member 22 extending transversely of the shell portion 12 and a second clamp member 24 extending transversely of the shell portion 12 to one side of the first clamp member 22. The first and second clamp members 22, 24 have fingers 26 at their longitudinal ends which are arranged to engage with the edge portion 14 of the shell portion 12 so as to fix the alternative tag 20 to the shell portion 12.

Likewise with the embodiment shown in FIGS. 1 to 4, as the shellfish grows the nacre grows around the fingers thereby preventing disengagement of the tag 20 from the shell portion 12.

Although the present embodiments have been described in relation to tags which are formed of magnetic material, it will be understood that other tags may be used, the important aspect being that the tag and thereby the shellfish to which the tag is attached is detectable by any suitable detection equipment. For example, the tag may be formed of any suitable metallic material which may or may not be magnetic and which is detectable using any suitable metal detection equipment. In another example, the tag may be composed of a material such that it is detectable by x-ray equipment.

It will be understood that the tag may also be composed of any suitable non-metallic material that is detectable by any suitable means. For example, the tag may comprise an electronic integrated circuit encased in a plastics or other resilient material. This tag may be detectable by the use of a suitable electronic detector. In another example, the tag may have affixed to it, or formed integrally with it, a plastic strip containing an alphanumeric string, a barcode, or any other suitable identifier, such that it may be identified-by a scanning device or by sight. Modifications and variations as would be apparent to a skilled addressee are deemed to be within the scope of the present invention.

The claims defining the invention are as follows:

1. A method of tagging a shellfish for the purpose of subsequent identification, said method including the steps of:
    providing a detectable tag arranged to fixedly engage in use with at least one edge of a shell portion of a shellfish; and
    fixedly engaging the detectable tag with the at least one edge portion of a shellfish such that as the shellfish grows the detectable tag becomes incorporated into the shell portion thereby preventing disengagement of the detectable tag from the shell portion.

2. A method as claimed in claim 1, wherein the detectable tag is a coil and the step of fixedly engaging the detectable tag with an edge portion of a shellfish includes the step of inserting the edge portion of the shellfish between adjacent turns of the coil.

3. A method as claimed in claim 1, wherein the detectable tag is a clamp arranged to engage with at least two substantially opposite portions of the edge portion of the shellfish.

4. A method as claimed in claim 3, wherein the clamp includes a first clamp member extending in a first direction relative to the shellfish and a second clamp member extending in a direction generally perpendicular to the first direction, the clamp members being provided at remote ends with fingers arranged to engage with the edge portion.

5. A method as claimed in claim 4, wherein the detectable tag is formed from a magnetisable material.

6. A method as claimed in claim 5, wherein the detectable tag is formed of steel.

7. A detectable shellfish including:
    a shellfish; and
    a detectable tag fixedly engaged with at least one edge of a shell portion of shellfish;
    the arrangement being that as the shellfish grows the detectable tag becomes incorporated into the shell portion thereby preventing disengagement of the detectable tag from the shell portion.

8. A detectable shellfish as claimed in claim 7, wherein the detectable tag is a coil arranged to receive an edge of a shell portion between adjacent turns of the coil.

9. A detectable shellfish as claimed in claim 8, wherein the shellfish is abalone.

10. A detectable shellfish as claimed in claim 7, wherein the detectable tag is a clamp arranged to engage with at least two substantially opposite portions of the edge portion of the shellfish.

11. A detectable shellfish as claimed in claim 10, wherein the clamp includes a first clamp member extending in a first direction relative to the shellfish and a second clamp member extending in a direction substantially perpendicular to the first direction, the first and second clamp members being provided at remote ends with fingers arranged to engage with the edge portion.

12. A detectable shellfish as claimed in claim 11, wherein the detectable tag is magnetised.

13. A detectable shellfish as claimed in claim 12, wherein the detectable tag is formed of steel.

14. A detectable shellfish including:
    a shellfish; and
    a detectable tag incorporated into the shell portion;
    the detectable tag being incorporated into the shell portion by engaging the detectable tag with at least one edge of the shell portion and allowing the shellfish to subsequently grow.

15. A detectable shellfish as claimed in claim 14, wherein the shellfish is abalone.

* * * * *